SYLVESTER A. WOOD, OF MANITOWOC, WISCONSIN.

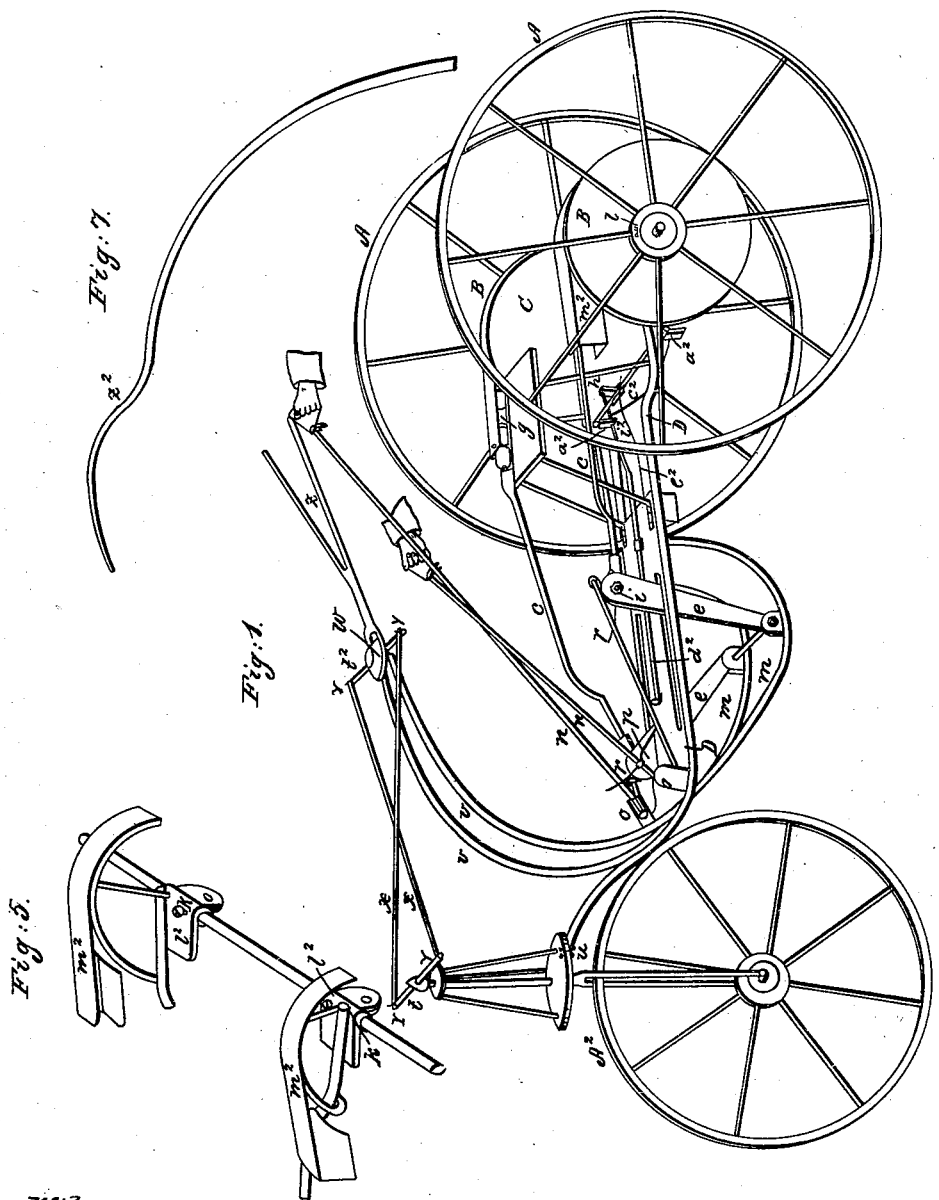

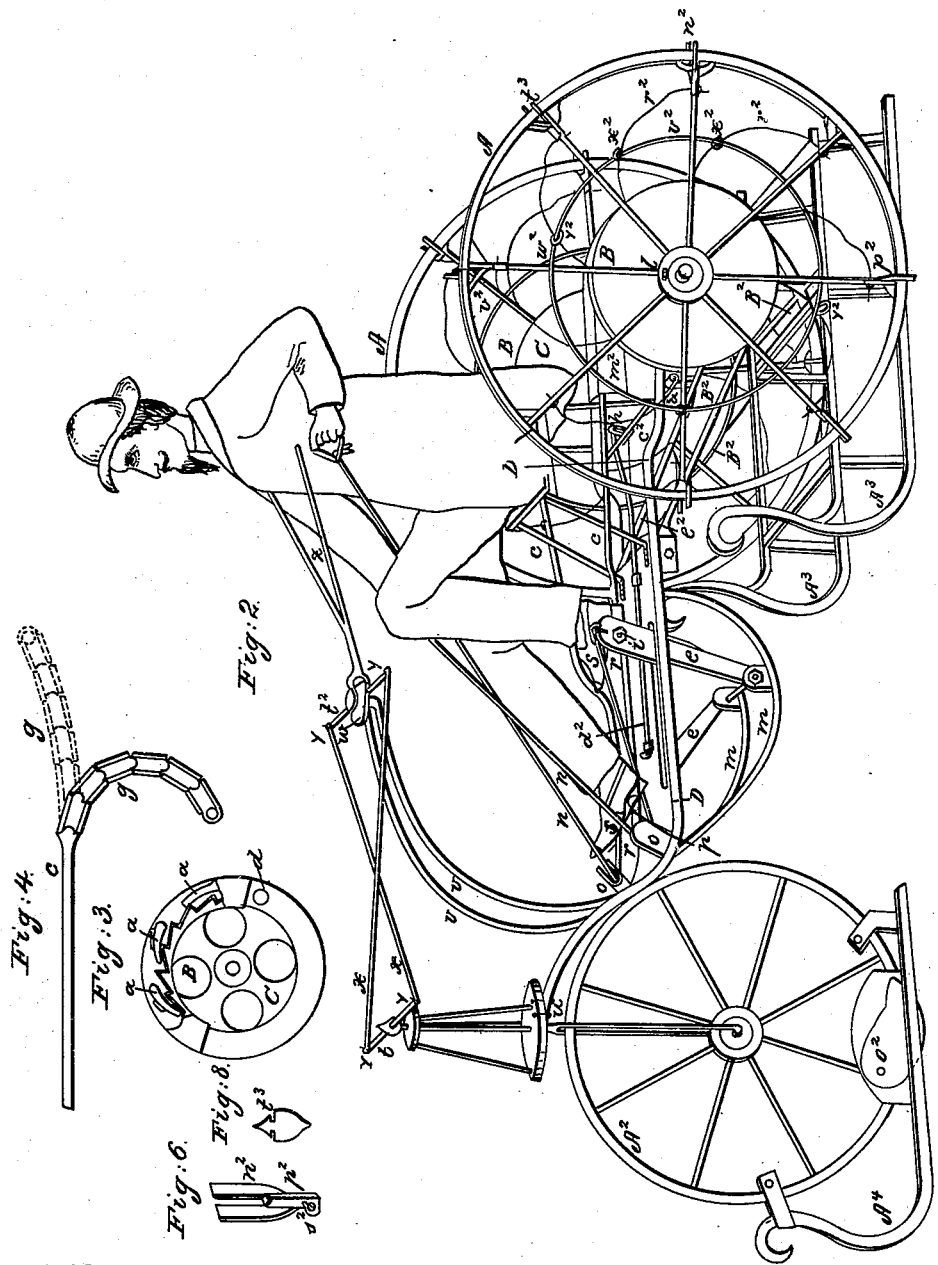

Letters Patent No. 85,501, dated December 29, 1868.

IMPROVEMENT IN VELOCIPEDES.

The Schedule referred to in these Letters Patent and making part of the same.

*To all whom it may concern:*

Be it known that I, SYLVESTER A. WOOD, of the village of Manitowoc, in the county of Manitowoc, and State of Wisconsin, have invented a new and useful Three-Wheeled Velocipede; and I do hereby declare that the following is a full, clear, and exact description of the construction and operation of the same, reference being had to the annexed drawings, making a part of this specification, in which—

Figure 1 is a perspective view;

Figure 2, a perspective view, with sleigh-attachments;

Figure 3, a side view of one of the pawl-pulleys, with an opening showing the pawls, a section of the ratchet-wheel, and how the pawls act on it, and the packing or cushions of the ratchet-wheel teeth;

Figure 4, a side view of one of the connecting-rods, with its brace-linked chain-extension;

Figure 5, a perspective view of the hind axle, and part of the reach, showing the reach-boxes or couplings, the set-screws therein, and the chain-guides;

Figure 6, a perspective view of one of the slotted paddles;

Figure 7, one of the paddle-springs; and

Figure 8, one of the slotted plates for guiding or steadying the paddles.

To each of the hind or driving-wheels A A, figs. 1 and 2, a ratchet-wheel, B B, figs. 1, 2, and 3, is securely fastened, the pawls or ratchets $a\ a\ a$, fig. 3, to operate which, are attached to the loose pawl-pulleys C C, figs. 1, 2, and 3, and are so arranged as to catch on the top of the ratchet-wheel by their own weight, (or they may be aided by light springs,) which pulleys have grooves on the edges, for the chain-extensions of the connecting-rods to run in, and turn upon the hind axle.

The chains $g$, figs. 1 and 4, forming the extensions of the connecting-rods $c\ c$, figs. 1, 2, and 4, are brace-linked, so as to bend downward only sufficiently to describe the circle of the bottom of the grooves in which they run, and upwards only a little out of a straight line, as shown by fig. 4, thus operating as a belt on the pawl-pulleys, thereby securing uniform leverage, when drawn out for the purpose of turning the ratchet-wheels, and any length of stroke within the compass of the motions of the feet, and as a rod or bar for turning or pushing back the pawl-pulleys.

These connecting-rods are attached to the pawl-pulleys by a pin, $d$, fig. 3, in each pulley, and to the levers $e\ e$, at $i$, figs. 1 and 2, which levers are hinged on the braces $m\ m$, figs. 1 and 2, and work backward and forward in slots between the floor of the vehicle and the reach D, figs. 1 and 2, connecting the forward wheel $A^2$, figs. 1 and 2, with the hind wheels A A.

At or near the top of each of the levers $e\ e$, a cord, $n$, is attached, which passes through one of the pulleys $o\ o$, figs. 1 and 2, and is held in that hand of the rider which is opposite the lever to which the cord is connected.

Near the top of each of the levers $e\ e$, a foot-pin, $p$, figs. 1 and 2, projects, upon which a treadle, $r$, figs. 1 and 2, is placed, which treadles turn or vibrate with the motions of the feet of the rider.

A strap, $s$, fig. 2, is secured to each foot, sufficiently loose to receive a treadle between it and the bottom of the foot, by drawing the foot backward over the top of the treadle, thereby securing the treadles to the feet, and enabling the rider to draw back the levers, connecting-rods, and pawl-pulleys, without liability of the feet slipping from the treadles, and at the same time permitting the feet to be easily detached from the treadles by pushing the feet forward.

The propulsion of the vehicle is produced by working the levers $e\ e$ back and forth with the feet, or the feet and hands combined, each forward motion of the levers, in combination with the chain-extension, connecting-rods $c\ c$, the pawl-pulleys C C, pawls $a\ a\ a$, and ratchet-wheels B B, giving the carriage-wheels A A, a forward turn, and each backward motion of the levers and connecting-rods turning back the pawl-pulleys and pawls, ready to make another forward turn of the carriage-wheels, which backward motion requires very little power, and but slightly retards the velocity of the vehicle, little resistance being given by the backward motion of the pawls over the ratchet-wheels.

To propel the carriage or vehicle with the feet alone, the levers are worked backward and forward by a motion of the feet similar to that in walking.

To propel it with the hands and feet combined, the hands assist the opposite feet by pulling on the cords or lines $n\ n$, thereby producing double the power obtained by working the feet alone.

For guiding the carriage, a cross-bar, $t$, figs. 1 and 2, is firmly secured to the upright forked shaft $u$, figs. 1 and 2, which keeps the forward wheel $A^2$ in position, at right angles with the plane of the wheel.

Between this cross-bar and the rider, and at the proper distance before the rider to be taken hold of with the hands, is a supplemental cross-bar, $t^2$, figs. 1 and 2, kept in place by the supporting-rods $v\ v$, figs. 1 and 2, a vertical pin through the centre, and the horizontal plates $w$, figs. 1 and 2, the ends of which cross-bars are movable back and forth horizontally.

These two cross-bars are connected by the rods or bars $x\ x$, figs. 1 and 2, by means of holes through them, and of the pins $y\ y\ y\ y$, figs. 1 and 2, projecting upward from the ends of both cross-bars.

These cross-bar connecting-rods are sufficiently long, and have holes so adjusted in them for the pins $y$, as to be placed either parallel with or across each other, as occasion may require.

When the carriage is propelled by the feet alone, it is more convenient, for guiding it, that the cross-bar connecting-rods should be parallel with each other, but when both the hands and the feet are used for propulsion, then the rods should be crossed, for the reason that when both the hands and feet are so employed, the guiding is done by the self-supporting forked lever $z$, figs. 1 and 2, which fits close to the body, under the arms of the rider, and is so adjusted to the supplemental cross-bar, as to swing it back and forth, as the forked lever turns to the right or the left, which right or left motion of the lever is given by the lateral inclinations of the rider's body, and by crossing the cross-bar connecting-rods, the forward wheel turns to the right when the body inclines to the right, and *vice versa*.

When the hands are not used for propulsion, the forked lever is detached from the body, by turning it forward, and the guiding done by taking hold of the supplemental cross-bar with the hands.

The vehicle is provided with brakes, $a^2 a^2$, attached to the bar $c^2$, which are operated by the foot-rod $d^2$, cord $e^2$, and lever $h$, and press against the ratchet-wheels D D, as shown by figs. 1 and 2, or they may be so adjusted as to act on the rims of the hind carriage-wheels themselves. The brakes, when not in use, are kept from contact with the wheels by the spring $i^2$, figs. 1 and 2.

The reach D is confined to the hind axle by the boxes or couplings $k k$, fig. 5, in which the axle turns freely when necessary.

The hind wheels also turn freely on the axle, but the hub of each wheel has a set-screw, $l$, figs. 1 and 2, and each box on the back end of the reach has a like set-screw, $l^2 l^2$, fig. 5, by which the wheels and reach-boxes may be made fast to the axle; but for general use, only the set-screws in the reach-boxes should be tightened to prevent the axle from turning, leaving the wheels free to turn on the axle. When, however, great speed is required, on a straight course or road, where it is not necessary to turn the vehicle, the set-screws in the wheel-hubs may be tightened, so as to make the wheels fast to the axle, and at the same time the set-screws in the reach-boxes loosened, so as to permit the axle to turn freely in them. By this arrangement the power applied by each stroke of the feet, or of the feet and hands combined, acts upon both wheels at the same time, and gives additional speed to the carriage, but only the most gradual turns of the carriage can be made, for the reason that both wheels, being fast to the axle, one or the other of them must drag in making any but the most gradual curves.

It is supposed that the chain-guides $m^2 m^2$, figs. 1, 2, and 5, may not be required in a full-sized velocipede, for practical use, as the chains may probably be made sufficiently strong and stiff to work well without the chain-guides.

For travelling on snow or ice, the following arrangement is adopted, to wit:

To the reach D the sleigh-runners $A^3$, fig. 2, are attached, by means of the frame $B^2 B^2 B^2$, fig. 2, the runners being placed an inch or so below the rims of the hind wheels, which are provided with slotted paddles, $n^2 n^2$, figs. 2 and 6, at the outward extremity of each spoke, which paddles project beyond the rims of the wheels and below the bottom of the sleigh-runners; and to the forward wheel, $A^2$, a single runner, $A^4$, fig. 2, is attached, which is provided with the supplemental guiding-runner or knife, $O^2$, fig. 2, working on a hinge and dropping below the forward runner, either through or beside it, in order to prevent any lateral motion or slipping of the forward runner.

The operations of the rider, for travelling on snow or ice, are the same as for travelling on land; but instead of the wheel rolling upon the snow or ice, the paddles catch in it and push the runners forward.

The paddles are made fast to a socket, $p^2$, figs. 2 and 6, on the end of each spoke of the hind wheels, and are pressed outward or drawn inward by the springs $r^2$, figs. 2 and 7, on each spoke, which springs pass through the eyes or loops $s^2$, fig. 6, on the inner end of each paddle-socket.

The paddles are kept from twisting or turning by passing through slots on each side of the plates $t^3$, figs. 2 and 8, fastened to the rims of the hind wheels at the end of each spoke; and as they are pressed outward by soft springs, they slide in readily as they come in contact with unyielding substances, and thus prevent any jolting arising from the paddles themselves.

The paddles may all be let out or drawn in simultaneously, so as to present a smooth-rimmed wheel, for travelling on the ground when the runners are detached, or paddled wheels, for travelling on snow or ice, with the runners attached, by the following arrangement, viz:

On each of the hind wheels is a ring, $v^2$, fig. 2, concentric with the rim of the wheel, attached to the spokes by the loops $w^2$, fig. 2, on each spoke, which ring slides back and forth in the loops which hold it in place.

Between each spoke, and on each sliding ring, a loop, $x^2$, fig. 2, is fastened, which loops embrace the springs $r^2$, between each spoke.

Also, attached to each of the sliding rings is a fulcrum-eye or eyes, $y^2$, fig. 2.

To let out the paddles, pass a rod or lever through one of the fulcrum-eyes $y^2$, and by the fore part of the wheel-hub, and pull forward, and all the paddles are let out.

To draw in the paddles, pass the lever through one of the fulcrum-eyes, and behind the wheel-hub, and push backward, and all the paddles are drawn in, and kept in by the loops $x^2$, embracing the springs, catching in the depressions in the springs, as shown at $z^2$, fig. 7.

The ratchet-wheels are made of two plates, with India-rubber packing between them, as shown by the section of the ratchet-wheel in fig. 3, cut to conform to the shape of the ratchet-wheel teeth, which packing operates as a cushion to deaden the sound of the pawls in passing over the teeth of the wheels.

Instead of making the ratchet-wheels of two plates, the wheels may be grooved, and the packing or cushions inserted in the grooves.

Other parts of the vehicle may be packed or cushioned, where practicable, with rubber or other suitable material, to prevent noise from the clattering of the parts.

To secure lightness, the various parts, where practicable, should be constructed of tubular or corrugated metal.

What I claim as my invention, and desire to secure by Letters Patent, is—

1. The ratchet-wheels B B, the pawls $a$, the pawl-pulleys C C, the pins $d d$, the connecting-rods $c c$, with their brace-linked chain-extensions $g$, the levers $e e$, the cords $n n$, and the pulleys $o o$, or their equivalents, the foot-pins $p p$, the treadles $r r$, and the foot-straps $s s$, all arranged and acting in combination with the wheels A A, reach D; and wheel $A^2$, substantially as and for the purpose herein set forth.

2. The supplemental cross-bar $t^2$, the pins $y$, the supporting-rods $v v$, the circular plates $w$, the cross-bar connecting-rods $x x$, and the forked lever $z$, all arranged and acting in combination with the forward cross-bar $t$, for guiding the vehicle, substantially as herein shown and described.

3. The hub set-screws $l l$, the reach-boxes or couplings $k k$, with their set-screws $l^2 l^2$, the chain-guides $m^2 m^2$, the brake-foot rod or bar $c^2$, and the packing or cushions for the ratchet-wheels, substantially as and for the purposes herein set forth.

4. In combination with the first above-described arrangement, combination, and operation of parts, the runners $A^3$ and $A^4$, the supplemental guiding-runner or knife $o^2$, the frame $B^2$, the slotted paddles $n^2$, the slotted plates $t^3$, the springs $r^2$, the sliding rings $v^2$, the fulcrum-eyes $y^2$, and the loops $x^2$, arranged and operating to propel the vehicle on snow or ice, substantially in the manner herein set forth and described.

5. A three-wheeled velocipede, the parts of which are constructed, arranged, and combined, substantially as and for the purposes herein shown and described.

Dated at Manitowoc, Wisconsin, November 20, 1868.

SYLVESTER A. WOOD.

Witnesses:
JNO. BINNS,
OTTO LEUBNER.